Patented June 29, 1926.

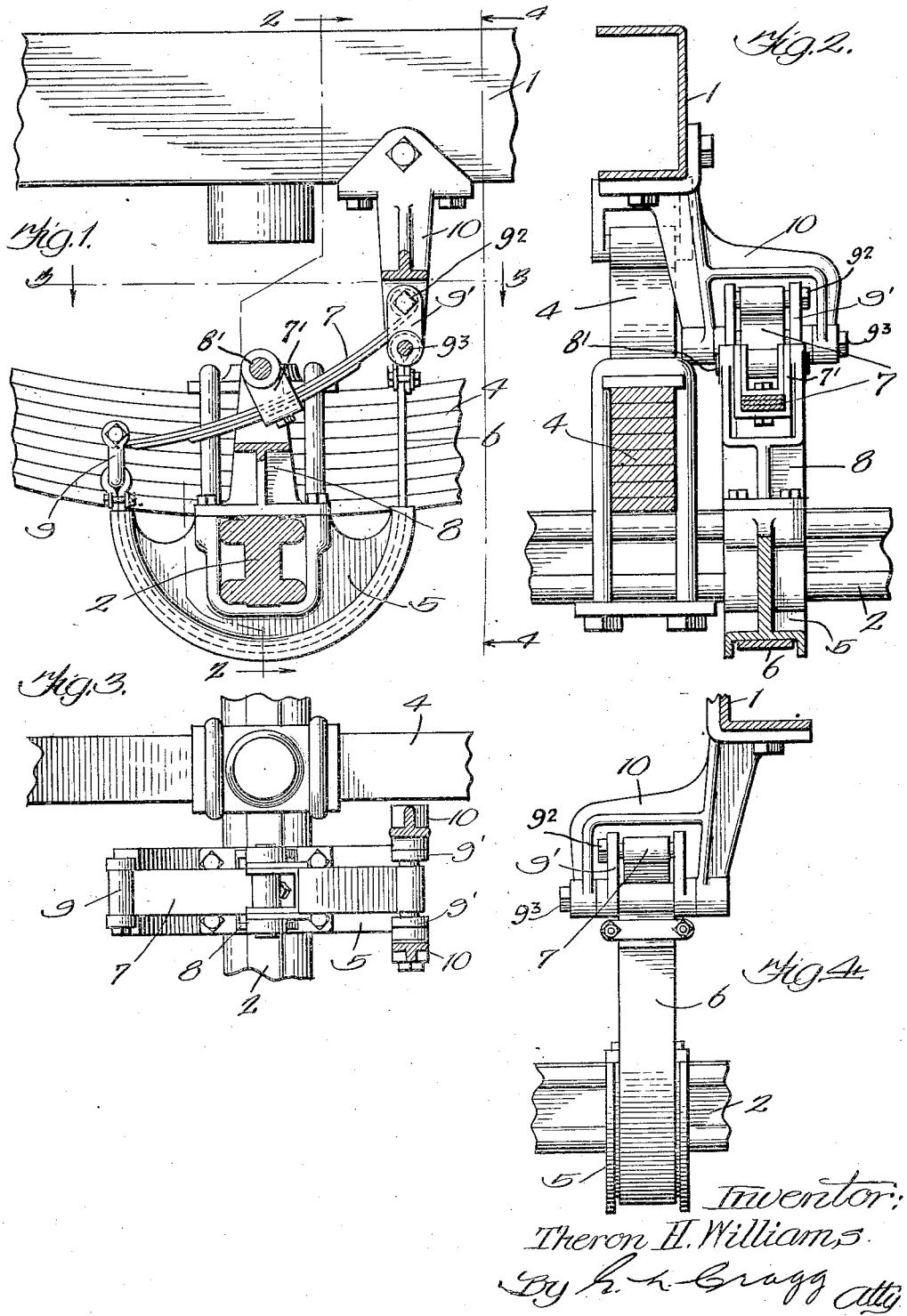

1,590,560

UNITED STATES PATENT OFFICE.

THERON H. WILLIAMS, OF CHICAGO, ILLINOIS.

SHOCK ABSORBER.

Application filed April 11, 1923, Serial No. 631,339. Renewed December 2, 1925.

My invention relates to vehicles employing vehicle bodies and running gears together with vehicle body supporting springs between these vehicle elements.

It is the object of my invention to provide an improved form of shock absorber between the body and running gear of such a vehicle. In my co-pending application Serial No. 631,338, filed April 11, 1923, I have disclosed an improved shock absorber comprising a friction body upon the vehicle body, a looped band whose bight receives and frictionally engages said friction body, an arm mounted to turn upon the running gear and connected with one end of said band whose other end is connected with the running gear, and arm actuating means between the vehicle elements and between said arm and vehicle body.

In the preferred arrangement of said co-pending application the friction is increased as the vehicle body approaches the running gear. In the arrangement herein disclosed the friction produced is preferably substantially uniform. In the other arangement the arm is upon one vehicle element and the friction body is upon the other. In the present arrangement both of these members are preferably upon the same vehicle element.

I will explain my invention more fully by reference to the accompanying drawing in which Fig. 1 is a side view, partially in section, of a portion of a vehicle structure having the preferred embodiment of my invention applied thereto; and Figs. 2, 3 and 4 are sectional views taken, respectively, on lines 2—2, 3—3 and 4—4 of Fig. 1.

Like parts are indicated by similar characters of reference throughout the different figures.

The vehicle illustrated is an automobile, though the invention is not to be thus restricted. A portion 1 of the body of the vehicle is illustrated as is also a portion 2 of the running gear. This running gear may be inclusive of vehicle wheels, not shown. This vehicle body is supported upon the running gear by means of supporting springs, one of these springs being illustrated at 4. The illustrated shock absorber includes a semi-circular friction body 5 that may be located upon the running gear. A band 6 is looped about the friction body 5 that is received in the bight of the band. An arm or member 7 is preferably pivoted between its ends upon the pedestal or bracket 8 secured to the running gear of the vehicle. In the preferred embodiment of the invention the spring arm 7 is borne by a carrier 7' which is journaled upon rod 8' that is carried at the upper end of the pedestal or bracket 8. This arm is preferably in the form of a semi-elliptic spring. The band 6 is assembled at one end with one end of the spring arm 7, through the intermediation of the upright shackle 9'. The upright shackle 9' preferably couples the remaining ends of the arm and band, the upper end of this shackle being assembled with the spring arm by the bolt $9^2$. The lower end of the shackle 9' is journaled upon the bolt $9^3$ carried by the bracket 10, the adjacent end of the band being also journaled upon this bolt, the remaining band end being desirably also pivotally connected with the bracket 10 depending from the vehicle body.

In the preferred embodiment of the invention the spring arm has its central portion, the portion equidistant from its ends, pivotally connected with the pedestal 8 carried by the running gear.

By the arrangement illustrated friction arises between the friction body and band upon movement of the vehicle body up and down and this friction is, preferably, substantially uniform. The shackles permit the spring arm to change its shape as the vehicle body rises and falls. The pull upon the band is preferably greater as the vehicle body rises.

There are desirably four such shock absorbers, one at each of the four vehicle wheels, but the invention is not to be thus restricted.

The term band is used in the broad sense of any suitable flexible friction producing member arranged as herein shown and claimed.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a vehicle body; of a vehicle running gear carrying said vehicle body; a shock absorber comprising a friction body upon one vehicle element, a band frictionally engaging said friction body; and an arm mounted to move upon the vehicle element carrying said friction body and having its ends assembled with the ends of the band.

2. The combination with a vehicle body; of a vehicle running gear carrying said vehicle body; a shock absorber comprising a friction body upon one vehicle element, a band frictionally engaging said friction body; and an arm mounted to move upon the vehicle element carrying said friction body and assembled with the ends of the band.

3. The combination with a vehicle body; of a vehicle running gear carrying said vehicle body; a shock absorber comprising a friction body upon one vehicle element, a band frictionally engaging said friction body; and an arm mounted between its ends to move upon the vehicle element carrying said friction body and having its ends assembled with the ends of the band.

4. The combination with a vehicle body; of a vehicle running gear carrying said vehicle body; a shock absorber comprising a friction body upon one vehicle element, a band frictionally engaging said friction body; and an arm mounted between its ends to move upon the vehicle element carrying said friction body and assembled with the ends of the band.

5. The combination with a vehicle body; of a vehicle running gear carrying said vehicle body; a shock absorber comprising a friction body upon one vehicle element, a band frictionally engaging said friction body; and an arm, formed of spring material, mounted to move upon the vehicle element carrying said friction body and having its ends assembled with the ends of the band.

6. The combination with a vehicle body; of a vehicle running gear carrying said vehicle body; a shock absorber comprising a friction body upon one vehicle element, a band frictionally engaging said friction body; and an arm, formed of spring material, mounted to move upon the vehicle element carrying said friction body and assembled with the ends of the band.

7. The combination with a vehicle body; of a vehicle running gear carrying said vehicle body; a shock absorber comprising a friction body upon one vehicle element, a band frictionally engaging said friction body; and an arm, formed of spring material, mounted between its ends to move upon the vehicle element carrying said friction body and having its ends assembled with the ends of the band.

8. The combination with a vehicle body; of a vehicle running gear carying said vehicle body; a shock absorber comprising a friction body upon one vehicle element, a band frictionally engaging said friction body; and an arm, formed of spring material, mounted between its ends to move upon the vehicle element carrying said friction body and assembled with the ends of the band.

9. The combination with a vehicle body; of a vehicle running gear carrying said vehicle body; and a shock absorber comprising a friction body upon one of said vehicle elements, an arm also mounted upon this vehicle element, a band connected at one end with one end of the arm and at its other end with the other vehicle element, this band having frictional engagement with said friction body, and a device operated by the other vehicle element and in actuating relation to said arm.

10. The combination with a vehicle body; of a vehicle running gear carrying said vehicle body; and a shock absorber comprising a friction body upon one of said vehicle elements, an arm also mounted upon this vehicle element, and a band connected at one end with one end of the arm and at its other end with the other vehicle element, this band having frictional engagement with said friction body and in which said friction body forms a bight, and a device operated by the other vehicle element and in actuating relation to said arm.

In witness whereof, I hereunto subscribe my name this 2nd day of April A. D., 1923.

THERON H. WILLIAMS.